March 20, 1951 W. B. BROTHERS 2,545,874
MECHANICAL UNIT FOR ADJUSTABLE LOUVERS
Filed Sept. 15, 1947 3 Sheets-Sheet 1

Inventor
William Benton Brothers

By Clarence A. O'Brien
and Harvey B. Jacobson
Attorneys

March 20, 1951 W. B. BROTHERS 2,545,874
MECHANICAL UNIT FOR ADJUSTABLE LOUVERS
Filed Sept. 15, 1947 3 Sheets-Sheet 2
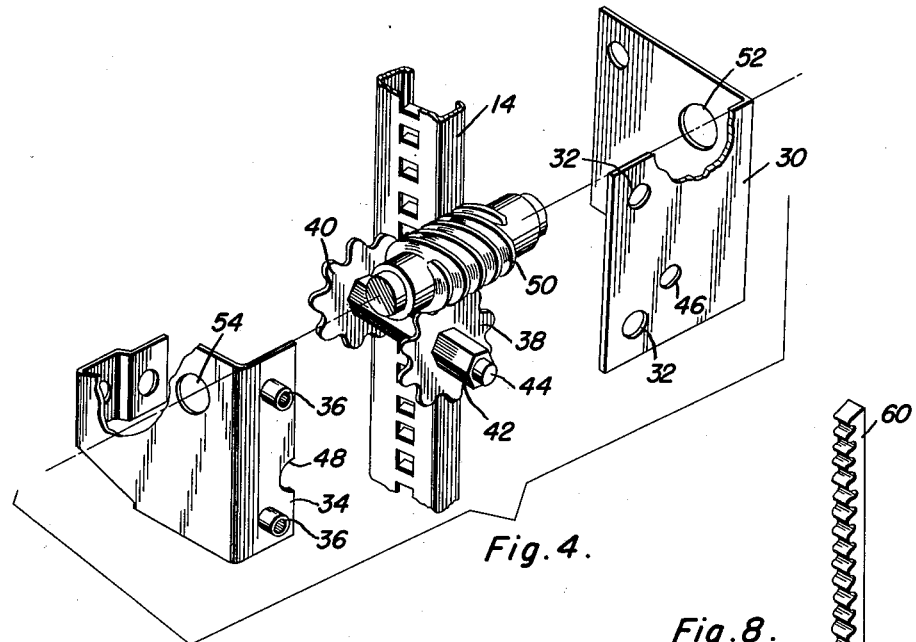
Fig. 4.
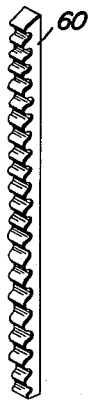
Fig. 8.
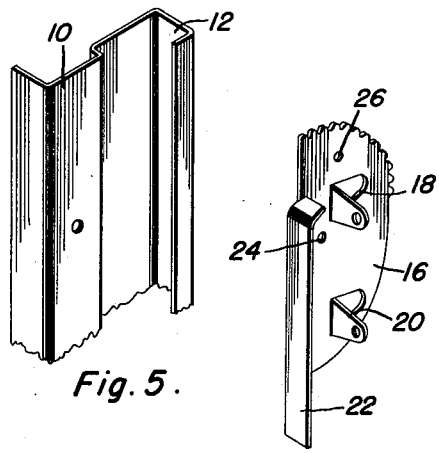
Fig. 5.
Fig. 6.
Fig. 7.
Inventor
William Benton Brothers
By Clarence A. O'Brien
and Harvey B. Jacobson
Attorneys March 20, 1951 W. B. BROTHERS 2,545,874
MECHANICAL UNIT FOR ADJUSTABLE LOUVERS
Filed Sept. 15, 1947 3 Sheets-Sheet 3

Inventor

William Benton Brothers

By Clarence A. O'Brien
and Harvey B. Jacobson
Attorneys

Patented Mar. 20, 1951

2,545,874

UNITED STATES PATENT OFFICE 2,545,874

MECHANICAL UNIT FOR ADJUSTABLE LOUVERS

William Benton Brothers, Miami, Fla., assignor of one-third to Cletus A. Ladig and one-third to John W. Stuteville, both of Miami, Fla.

Application September 15, 1947, Serial No. 773,962

4 Claims. (Cl. 268—88)

This invention appertains to novel and useful improvements in window and door constructions, particularly of the type utilizing louvers for the purpose of controllably preventing light, air, and other elements from entering the room utilizing such an improved construction.

An object of this invention is to provide means for adjustably controlling louvers normally positioned within a window sash or the like.

Another object of this invention is to provide means for attaching a plurality of louvers to segmental gears, the said segmental gears being pivotally mounted within a pair of guides or rails.

Another object of this invention is to provide means for interconnecting a plurality of segmental gears having the said louvers positioned thereon.

Another object of this invention is to provide an extremely simple, inexpensive device of the character described which may be easily installed within window sashes and the like.

Other objects and features of novelty will become apparent to those skilled in the art, in following the description of the preferred form of the present invention, illustrated in the accompanying drawings, wherein:

Figure 4 is an exploded view shown in perspective, illustrating the actuation means utilized in conjunction with the present invention;

Figure 5 is a fragmentary perspective view of the rail or guide utilized in conjunction with this invention;

Figure 6 is a perspective view of the segmental gear forming part of the invention;

Figure 7 is a sectional view illustrating the actuation means forming part of the present invention;

Figure 8 illustrates a conventional rack gear which may be used as an alternate construction in the present invention;

Referring now in detail to the illustrated preferred embodiments of the present invention, like reference characters are used throughout to indicate similar elements.

This invention has been developed to provide a device for adjusting louvers to selected positions, easily and dextrously. It is further within the purview of the present invention to supply a complete unit which may be very simply and easily fabricated on the set of construction operation. This, of course, tends to reduce the cost of the device, thereby rendering utility of the invention economical.

Figure 1:
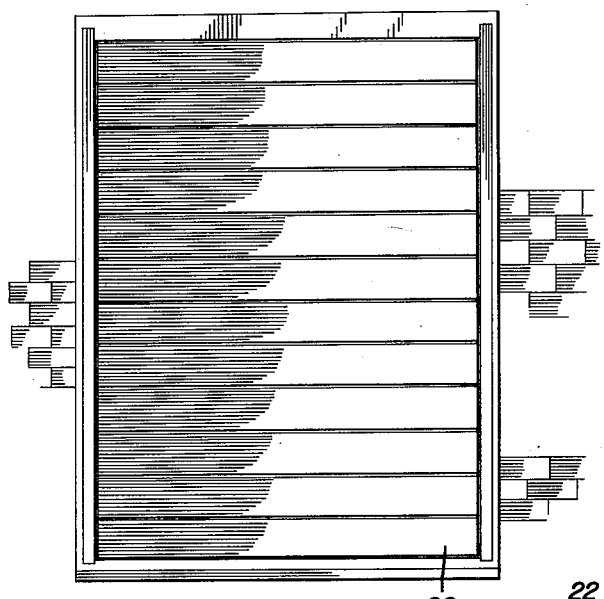
Figure 1 is an elevational view of the invention, showing the same in a closed form.
Figure 2:
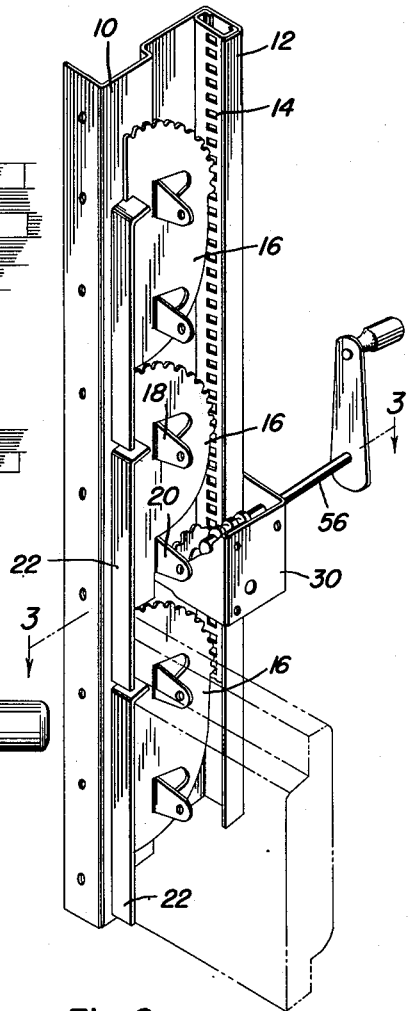
Figure 2 is a perspective view of one form of the present invention, showing the louvers removed.
Figure 3:
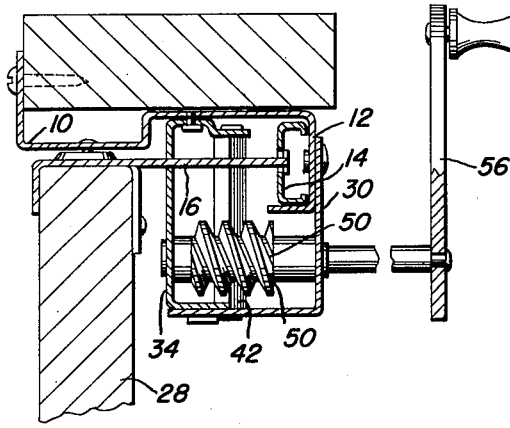
Figure 3 is a transverse sectional view of the invention shown in Figure 2 taken substantially on the line 3—3 thereof and in the direction of the arrows.

Referring to the first embodiment of the invention, reference is made primarily to Figure 2 wherein there is disclosed a rail or guide 10 having a channel member 12 formed therein. Slidably received in this channel member 12 is a rack gear or operating member 14, preferably of the light weight, pressed metal type.

Referring to Figure 6, it will be noted that a segmental gear 16 is provided with a pair of brackets 18 and 20 respectively extending therefrom. A clip 22 is also secured to the said segmental gear 16 opposite the brackets 18 and 20. Going further into the disclosure of Figure 6, it will be noted that a pair of apertures 24 and 26 are supplied therein, the said aperture 24 being utilized for pivotally mounting the segmental gear 16 within the rail 10.

A plurality of these segmental gears 16 are juxtapositioned within the rail 10 and the teeth portion of the said gears are engageable with the rack gear 14. It is immediately obvious from an inspection of Figure 2 that upon movement of the said rack gear within the channel 12, each of the said segmental gears will be rotated.

Positioned between the brackets 18 and 20 and the said clip 22 is a louver or louver member 28. This louver is attached to the said bracket through the utility of bolts, screws, or any other equivalent. The clip 22 engages the outer surface of the said louvers 28 for the purpose of firmly clamping this louver in position.

Going now to Figure 4, it will be seen that a bracket 30 is secured to the channel portion 12 of the said rail 10 and apertures 32 are formed therein. The complemental bracket 34 is supplied having lugs 36 extending therefrom. These lugs are engageable in the said apertures 32 in order to retain the brackets 30 and 34, respectively, in the proper fixed position. It will be noted at this point that the said bracket 34 is also secured to the rail 10 by any suitable means such as a rivet, by means of welding, brazing, screwing, or the like. A pair of spaced gears 38 and 40, respectively, having a shaft 42 extending therethrough is provided. This shaft may have a reduced portion 44 at the terminal portion thereof engageable with a selected aperture 46 in the said bracket 30. Obviously, a cut-out or recess 48 may be supplied in the said bracket 34 for the purpose of permitting free access and rotation of the shaft in its journaling point.

The said pair of gears 38 and 40, respectively, are engageable with a worm gear 50 and the teeth of the said rack gear 14, respectively. The said worm gear 50 is journaled in suitable apertures 52 and 54, respectively, which are formed in the brackets 30 and 34. Handle means for rotating the worm is provided in association with the said worm gear 50 and may be noted at 56.

In lieu of the rack gear 14, a second type of rack 60 may be supplied with only a small change in the size of the channel 12 requisite to accommodate this modified form of gear. Of course, the function of the said rack gear 60 is identical to that of the gear 14.

The said louvers 28 extend across a window, door, or the like and terminate in a second set of segmental gears 16. In order to efficaciously operate this second set of segmental gears, the apertures 26 mentioned above are utilized. A spacer 62 extends longitudinally of the said second row of segmental gears 16 and is pivoted to each of the said gears. A pin 64 extends through suitable apertures in the said spacer and through each aperture 26 provided in each of the said gears 16. Of course, this construction transmits the force utilized in sliding the rack gear 14 to the opposite sides of the louvers 28 for an even and smooth action.

Figure 9:
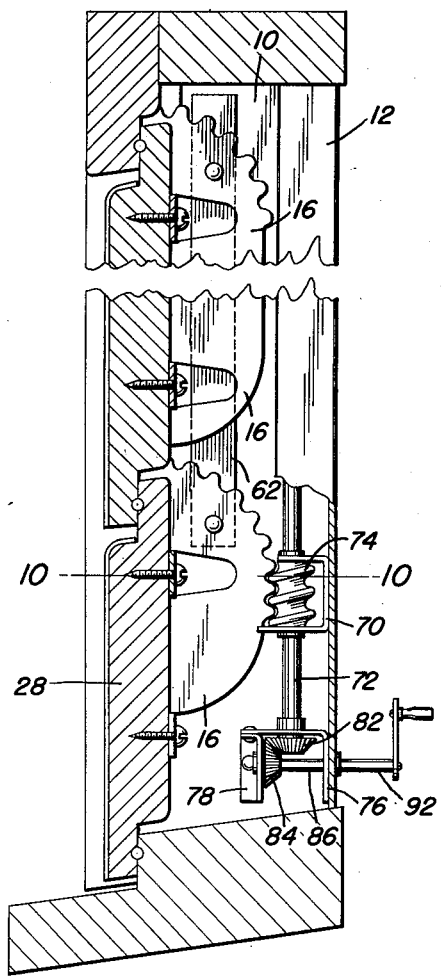
Figure 9 is a sectional view illustrating a second embodiment of the invention.
Figure 10:
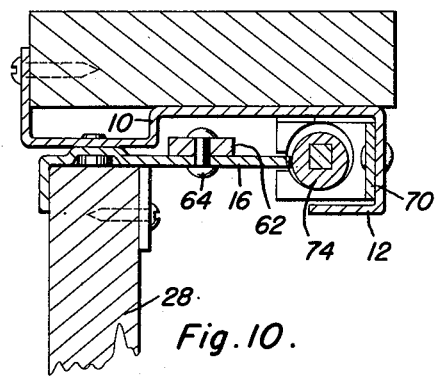
Figure 10 is a transverse sectional view of the invention shown in Figure 9 and taken on the line 10—10 thereof.
Figure 11:
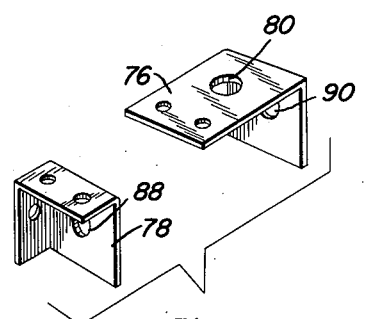
Figure 11 is an exploded perspective view illustrating a clamp means utilized in this invention.

Referring now to the second embodiment of the invention, reference is made primarily to Figure 9. The majority of the elements utilized in this embodiment of the invention are identical to those utilized in the first described form thereof and will be given the same reference characters. Segmental gears 16 are associated with the said rail 10 and the usual louvers 28 are secured to each of the said segmental gears. Bracket means 70 may be rigidly secured within the track 12 and a shaft 72 journaled therein. A worm gear 74 is fixed to the said shaft 72 and is engageable with a selected segmental gear 16. A bracket 76 is also secured within the said track 12 and a complemental bracket 78 is fixedly received in the rail 10 for the purpose of cooperating with the said bracket 76 to form a perch. An aperture 80 is supplied in the bracket 76 for the purpose of journaling the shaft 72 therein. A bevel gear 82 is secured at the terminal portion of the said shaft 72 and is engageable with a second bevel gear 84. This last-mentioned bevel gear has a shaft 86 extending therefrom and also journaled in suitable apertures 88 and 90, respectively, in the said brackets 76 and 78. The said shaft 92 has handle means extending therefrom for the purpose of rotating the shaft 72, thereby actuating the louvers to the selected position.

The spacer 62 is pivotally secured to each of the said segmental gears 16 for synchronizing the actuation of all of the gears. Of course, in this embodiment of the invention, a construction similar to that in conjunction with the first embodiment for the opposite side of the louver construction may be supplied. This permits of further synchronization and even transmutation of force.

It will be noted, at this point, that for engineering purposes a portion of a selected segmental gear may be cut away in order to provide space for the bracket 30, in conjunction with the first embodiment of the invention. This, however, falls within the scope and purview of the invention, concerning the various small departures that may be made therefrom without departing from the spirit of the invention. Accordingly, limitation is sought only in accordance with the scope of the following claims.

Having described the invention, what is claimed as new is:

1. Means for selectively controlling the entry of light and air into a room comprising a first and second vertical rail, a first set and a second set of segmental gears respectively pivoted to said rails, front and rear clips secured to each of said gears, louvers extending across said rails and secured between said first and second clips, means connecting the gears of the first set in the first rail, a shaft journaled in said first rail, means for drivingly connecting said shaft and said last-mentioned gears to rotate said first set of gears, and means connecting the gears of the second set in said second rail comprising a spacer engaging each of said last-mentioned gears.

2. A louver control apparatus comprising a pair of vertical rails, each rail including a vertical rear channel member with an open front facing the front of the rail and a raised vertical portion spaced from the channel member, a set of segmental gears each with a clip at the front thereof and teeth at the rear thereof, pivot pins fastening each gear to the raised portion of one rail, a bracket fixed to each gear at a point intermediate said teeth and said clips, a second set of segmental gears fixed for pivotal movement to the raised portion of the other of the rails, a spacer engaging each gear of the second set, louver members secured to opposite gears of each set, each louver having one end fixed between one said bracket and one clip of one of the gears of the first-mentioned set of gears, and means fixing the opposite end of each louver member to the opposite gear in the second set.

3. A louver control apparatus comprising a pair of vertical rails, each rail including a vertical rear channel member with an open front facing the front of the rail and a raised vertical portion spaced from the channel member, a set of segmental gears each with a clip at the front thereof and teeth at the rear thereof, pivot pins fastening each gear to the raised portion of one rail, a bracket fixed to each gear at a point intermediate said teeth and said clips, a second set of segmental gears fixed for pivotal movement to the raised portion of the other of said rails, a spacer operatively engaging each gear of the second set, louver members secured to opposite gears of each set, each louver having one end fixed between one said bracket and one clip of one of the gears of the first-mentioned set of gears, and means fixing the opposite end of each louver member to the opposite gear in the second set, each clip having a pair of legs with one leg disposed on the longitudinal edge of one louver member, and the other leg disposed on a face of the one louver.

4. A louver control apparatus comprising a pair of vertical rails, each rail including a vertical rear channel member with an open front facing the front of the rail and a raised vertical portion spaced from the channel member, a set of segmental gears each with a clip at the front thereof and teeth at the rear thereof, pivot pins fastening each gear to the raised portion of one rail, a bracket fixed to each gear at a point intermediate said teeth and said clips, a second set of segmental gears fixed for pivotal movement to the raised portion of the other of the rails, a spacer operatively engaging each gear of the second set, louver members secured to opposite gears of each set, each louver having one end fixed between one said bracket and one clip of one of the gears of the first-mentioned set of gears, means fixing the opposite end of each louver member to the opposite gear in the second set, each clip having a pair of legs with one leg disposed on the longitudinal edge of one louver member, the other leg disposed on a face of the one louver, and means for operating said first-mentioned set of gears including a housing fixed to one of the rails with a gear train disposed therein, and a gear member disposed in the channel in the rail to which the housing is attached, and said gear member being enmeshed with said first set of segmental gears and drivingly connected with said gear train.

WILLIAM BENTON BROTHERS.

REFERENCES CITED

The following references are of record in the file of this patent:

UNITED STATES PATENTS

| Number | Name | Date |
|---|---|---|
| 175,236 | Bliss | Mar. 28, 1876 |
| 182,075 | Jaqua | Sept. 12, 1876 |
| 425,542 | Hantsche | Apr. 15, 1890 |
| 1,014,679 | VonWagner | Jan. 16, 1912 |
| 1,496,055 | Jenkins | June 3, 1924 |
| 1,830,487 | Sanberg | Nov. 3, 1931 |
| 2,164,814 | Griffith | July 4, 1939 |
| 2,228,439 | Cerny | Jan. 14, 1941 |
| 2,272,722 | Morin | Feb. 10, 1942 |
| 2,331,823 | Baldock | Oct. 12, 1943 |